(12) United States Patent
Xu et al.

(10) Patent No.: US 8,725,346 B2
(45) Date of Patent: May 13, 2014

(54) COLLISION SEVERITY DETERMINATION SYSTEM AND METHOD

(75) Inventors: Yangsheng Xu, Hong Kong (CN); Guoqing Xu, Hong Kong (CN); Yongquan Chen, Hong Kong (CN); Huihuan Qian, Hong Kong (CN); Xin Shi, Hong Kong (CN); Ning Ding, Hong Kong (CN); Wing Kwong Chung, Hong Kong (CN); Yuandong Sun, Hong Kong (CN); Maxwell Chow, Hong Kong (CN)

(73) Assignee: Hong Kong Productivity Council, Kowloon (HK)

( * ) Notice: Subject to any disclaimer, the term of this patent is extended or adjusted under 35 U.S.C. 154(b) by 173 days.

(21) Appl. No.: 13/314,188

(22) Filed: Dec. 8, 2011

(65) Prior Publication Data

US 2012/0158249 A1 Jun. 21, 2012

Related U.S. Application Data

(60) Provisional application No. 61/423,500, filed on Dec. 15, 2010.

(51) Int. Cl.
*G06F 17/00* (2006.01)

(52) U.S. Cl.
USPC ........... 701/31.4; 701/32.2; 701/45; 340/436; 340/438; 340/440

(58) Field of Classification Search
USPC ........... 701/32.2, 45, 70, 31.4, 31.5; 340/436, 340/438, 440
See application file for complete search history.

(56) References Cited

U.S. PATENT DOCUMENTS

| | | | |
|---|---|---|---|
| 5,285,188 A | 2/1994 | Yoshida | |
| 5,732,374 A | 3/1998 | Ohm | |
| 5,900,807 A | 5/1999 | Moriyama et al. | |
| 6,023,664 A * | 2/2000 | Bennet | 701/70 |
| 6,411,204 B1 * | 6/2002 | Bloomfield et al. | 340/467 |
| 6,431,593 B1 * | 8/2002 | Cooper et al. | 701/45 |
| 6,459,988 B1 | 10/2002 | Fan et al. | |
| 6,816,766 B2 | 11/2004 | Sala et al. | |
| 7,119,669 B2 | 10/2006 | Lundsgaard et al. | |
| 7,162,340 B2 * | 1/2007 | Schubert et al. | 701/38 |
| 2002/0169535 A1 * | 11/2002 | Imai et al. | 701/45 |
| 2004/0254729 A1 * | 12/2004 | Browne et al. | 701/301 |
| 2010/0017061 A1 * | 1/2010 | Lu et al. | 701/41 |
| 2010/0219944 A1 * | 9/2010 | Mc Cormick et al. | 340/436 |
| 2010/0324774 A1 * | 12/2010 | Bouni et al. | 701/29 |

* cited by examiner

*Primary Examiner* — Thomas Tarcza
*Assistant Examiner* — Kevin Myhre
(74) *Attorney, Agent, or Firm* — Eagle IP Limited; Jacqueline C. Lui

(57) ABSTRACT

A system for vehicle safety enhancement is disclosed. The system comprises a sudden slowdown detection subsystem, a slight bump detection subsystem, an airbag activation and brake malfunction detection subsystem, and a rollover detection subsystem. A controlling unit is connected to each subsystem for determining a severity level of a collision involving a vehicle, and the controlling unit is in turn connected to a communication unit for sending an alert signal based on the severity level. A method for vehicle safety enhancement is also disclosed.

13 Claims, 3 Drawing Sheets

US 8,725,346 B2

COLLISION SEVERITY DETERMINATION SYSTEM AND METHOD

CROSS-REFERENCE TO RELATED APPLICATION

This application claims benefit under 35 U.S.C. §119(e) of U.S. Provisional Application having Ser. No. 61/423,500 filed on Dec. 15, 2010, which is hereby incorporated by reference herein in its entirety.

FIELD OF INVENTION

Development of a safety system for vehicles always focuses on collision detection. When an accident happened, it is more important to classify the severity level of a collision. According to the severity level, a vehicle safety enhancement system can alert and report others such as nearby drivers and traffic center in order to reduce chained accidents and life-threatening injuries.

BACKGROUND OF INVENTION

General Motors Corporation invented a continuous collision severity prediction system which uses electronic front sensors (front-end accelerometers) to trigger severity calculation. Thereafter, it calculates the severity level using the sensing and diagnostic module. In fact, the use of electronic front sensors is not able to detect situations such as rolling over, and sudden slowdown.

Moreover, Takata Corporations developed a vehicle collision detecting system which includes an impact sensor for collision detection, and a distance sensor to detect any unavoidable collision by differentiating the distance. If a collision is detected or unavoidable, the airbag will be inflated. Nevertheless, it only focuses on head-on collisions without analyzing the severity levels of collision.

Furthermore, Sensor Technology Co. Ltd. developed a collision detection device which detects a collision by two one-axis acceleration sensors. It can also categorize the signals into different components and select different passenger safety devices. However, it can still not classify sudden slowdown, rolling over, etc.

In 1998, Daewoo Electronics Co. Ltd developed a method for judging a collision by using three directional accelerative signals. It analyzes the relationship of velocity with respect to time in three different axels and classifies 8 mph front barrier collision, 14 mph oblique collision and 16 mph center pole collision. However, it is not able to detect rolling over and sudden braking.

In 2002, At Road, Inc. presented a method and system for detecting vehicle collision using global positioning system. Abnormal deceleration is detected by second order differentiating the position signal from GPS. It assumes that such deceleration is only caused by external force such as collision. Motorola, Inc. designed a mobile phone to detect collision of a vehicle in 2006. It is able to transmit the collision signal through a mobile phone network. Although the prior inventions are developed for the detection of vehicles collision, they are not able to classify different severity levels such as rolling over, airbag activation, slight bumping, and sudden slowdown.

Obviously, the major problem of existing inventions is the failure of categorizing the severity level of a collision. With this capability, a traffic control center can make the decision on what resource should be used promptly. For instances, if it is just a slight bumping, maybe only traffic policy will be enough, and the most important need will be to ask the drivers drive their vehicles aside of the road for the recovering of traffic. If the airbag is activated or there is rolling over, ambulance should be called automatically and promptly to save the injured.

SUMMARY OF INVENTION

In the light of the foregoing background, it is an object of the present invention to provide an alternate system and method for vehicle safety enhancement.

Accordingly, the present invention, in one aspect, is a system for vehicle safety enhancement comprising a sudden slowdown detection subsystem, a slight bump detection subsystem, an airbag activation and brake malfunction detection subsystem, and a rollover detection subsystem. A controlling unit is connected to each subsystem for determining a severity level of a collision involving a vehicle, and the controlling unit is in turn connected to a communication unit for sending an alert signal based on the severity level.

In an exemplary embodiment of the present invention, the sudden slowdown detection subsystem comprises a first single-axis accelerometer oriented in a predetermined direction. The slight bump detection subsystem comprises a second single-axis accelerometer oriented in the same predetermined direction. The dynamic range of the second accelerometer is larger than that of the first accelerometer.

In another exemplary embodiment, the rollover detection subsystem comprises a three-axis accelerometer.

In one embodiment, the slight bump detection subsystem is installed right behind a front bumper of the vehicle.

In another aspect of the present invention, a method for vehicle safety enhancement is disclosed. The method comprises the steps of determining whether a rollover, an airbag activation and/or a brake malfunction, a slight bump or a sudden slowdown has occurred. An alert signal is then transmitted based on the results of the determining steps.

Based on this system, a traffic control center can make the decision on what resource should be used promptly. For instances, if it is just a slight bumping, only traffic policy may be enough, and the most important need will be asking drivers to drive their vehicles aside of the road in order to recover the traffic back to normal. If the airbag is activated or there is a rollover, ambulance should be called automatically and promptly to save the injured.

The present invention is described in an illustrative way and the terminology used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

BRIEF DESCRIPTION OF FIGURES

FIG. 2b is a side view of the vehicle as shown in FIG. 2a

DETAILED DESCRIPTION OF THE PREFERRED EMBODIMENTS

As used herein and in the claims, "comprising" means including the following elements but not excluding others.

As used herein and in the claims, "couple" or "connect" refers to electrical coupling or connection either directly or indirectly via one or more electrical means unless otherwise stated.

As used herein and in the claims, "x-axis" refers to the direction from the front to the back of the vehicle, "y-axis" refers to the direction from the left to the right of the vehicle, and "z-axis" refers to the direction from the bottom to the top of the vehicle.

Figure 1:
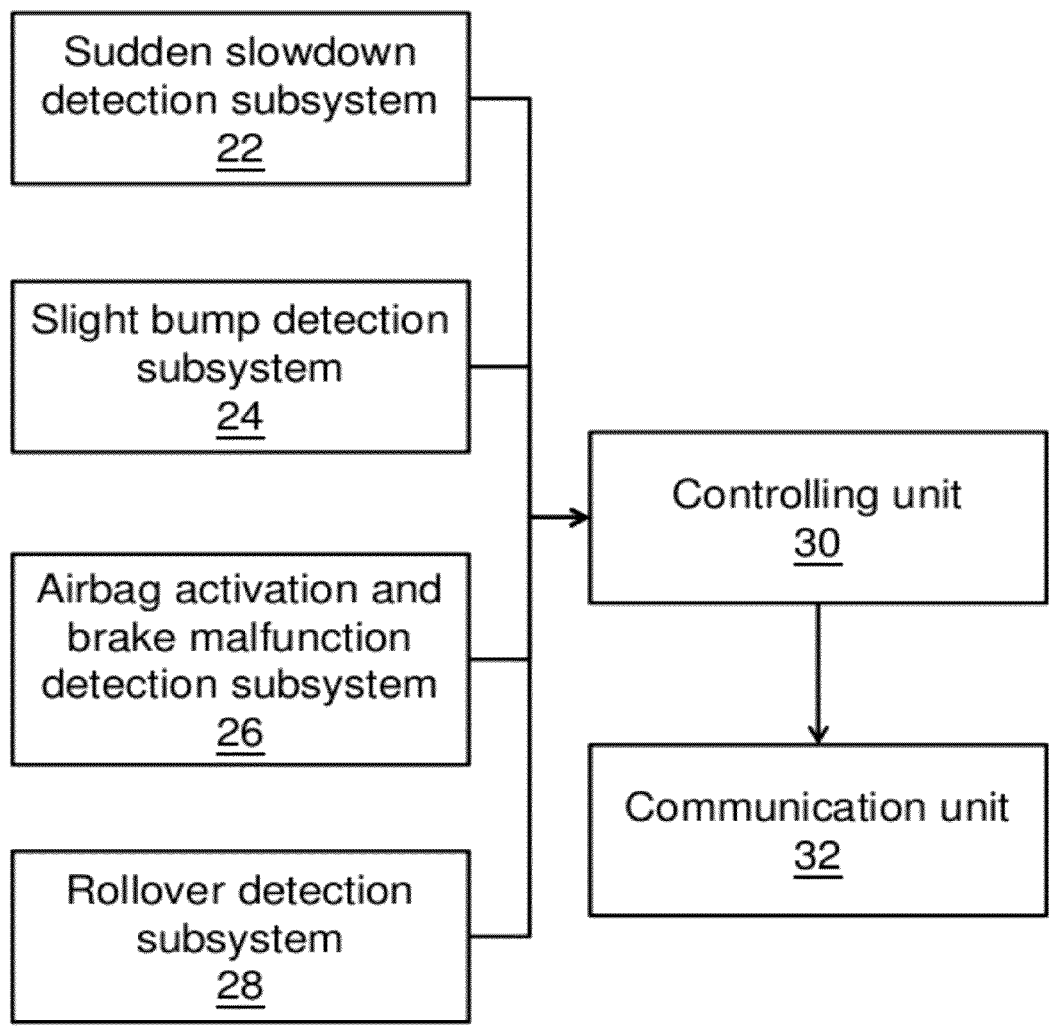
FIG. 1 is a block diagram of a system for vehicle safety enhancement, according to an embodiment of the present invention.

Referring now to FIG. 1, the first embodiment of the present invention is a system 20 for analyzing a severity level of a collision of a vehicle. The system 20 comprises a sudden slowdown detection subsystem 22, a slight bump detection subsystem 24, an airbag activation and brake malfunction detection subsystem 26, and a rollover detection subsystem 28. The four subsystems are connected to a controlling unit 30, and the controlling unit 30 is in turn connected to a communication module 32.

In an exemplary embodiment, the sudden slowdown detection subsystem 22 comprises a first single-axis accelerometer oriented to detect accelerations along x-axis. In a further embodiment, the accelerometer has a dynamic range of 6 g, meaning that the accelerometer can detect accelerations up to 6 g, the accelerometer overflows for accelerations over 6 g.

In sudden slowdown situations, the accelerometer will detect a negative acceleration larger than normal for a period of time, persisting for example in the order of seconds. The accelerometer deems the vehicle is in a sudden slowdown situation when the negative acceleration is larger than a sudden slowdown acceleration threshold and the period of time is larger than a sudden slowdown time threshold. In a specific embodiment, the thresholds are 5 m/s² and 1 s respectively.

In an exemplary embodiment, the slight bump detection subsystem 24 comprises a second single-axis accelerometer oriented to detect accelerations along x-axis, which is the same as the sudden slowdown detection subsystem 22. However, the dynamic range of this single-axis accelerometer in the slight bump detection subsystem 24 is larger than that in the sudden slowdown detection subsystem 22. In an exemplary embodiment, the dynamic range of the single-axis accelerometer is 30 g, which corresponds to a collision speed of about 12 km/h. In other embodiments, the dynamic range can be 12 g, 70 g or 500 g, depending on the characteristics of the vehicle or the tolerance.

In a slight bump, for example with an object in front of the vehicle, the instantaneous negative acceleration is larger than that in sudden slowdown situations, but lasts for a shorter period of time. Similar to above, the accelerometer deems the vehicle had a slight bump to an object in front when the negative acceleration is larger than a slight bump acceleration threshold and the period of time is larger than a slight bump time threshold. In a specific embodiment, the thresholds are 100 m/s² and 0.1 s respectively.

In an exemplary embodiment, the airbag activation and brake malfunction detection subsystem 26 comprises an airbag sensor and a brake malfunction sensor. The airbag sensor and the brake malfunction sensor are both connected to a dashboard of the vehicle for collection of relevant data. In a specific embodiment, a sensing circuit is connected to the dashboard directly or indirectly in order to collect the desired signals.

The vehicle has existing mechanisms to monitor the conditions for activation of the airbag, and the conditions are carefully set to ensure safety of the driver or passengers in the vehicle. As such, a separate accelerometer is not essential for this subsystem 26. Existing vehicles usually also has sensors monitoring the conditions for every important part, for example engine, brake, etc. Any malfunction of these parts generally will be alerted to the driver by a warning light on the dashboard. For the purposes of the present invention, the brake condition is a more important than engine condition since it is more likely that a brake malfunction will result in a collision or damage to properties. As the malfunction signal is routed to the dashboard, the present system takes this signal from the dashboard to minimize the modifications needed to be done to the vehicle.

In an exemplary embodiment, the rollover detection subsystem 28 comprises a three-axis accelerometer oriented to detect accelerations along x-axis, y-axis and z-axis simultaneously. In an exemplary embodiment, the dynamic range of the three-axis accelerometer is 1.5 g.

As compared to the subsystems 22 and 24 above, the rollover detection subsystem 28 utilizes a three-axis accelerometer. This is because the vehicle has acceleration in all three axes during a rollover. The acceleration in all three axes is taken into account for determining the axis of rotation.

In an exemplary embodiment, the controlling unit 30 is also connected to external sensors such as yaw rate sensor or acceleration pedal sensor for providing additional information for processing.

In an exemplary embodiment, the communication unit 32 is a GPRS unit adapted to wirelessly transmit signals to external locations, such as a traffic control center, an emergency rescue department or other parties that may need such data. The identity of the vehicle can also be determined by the address of the GPRS connection.

Figure 2A:
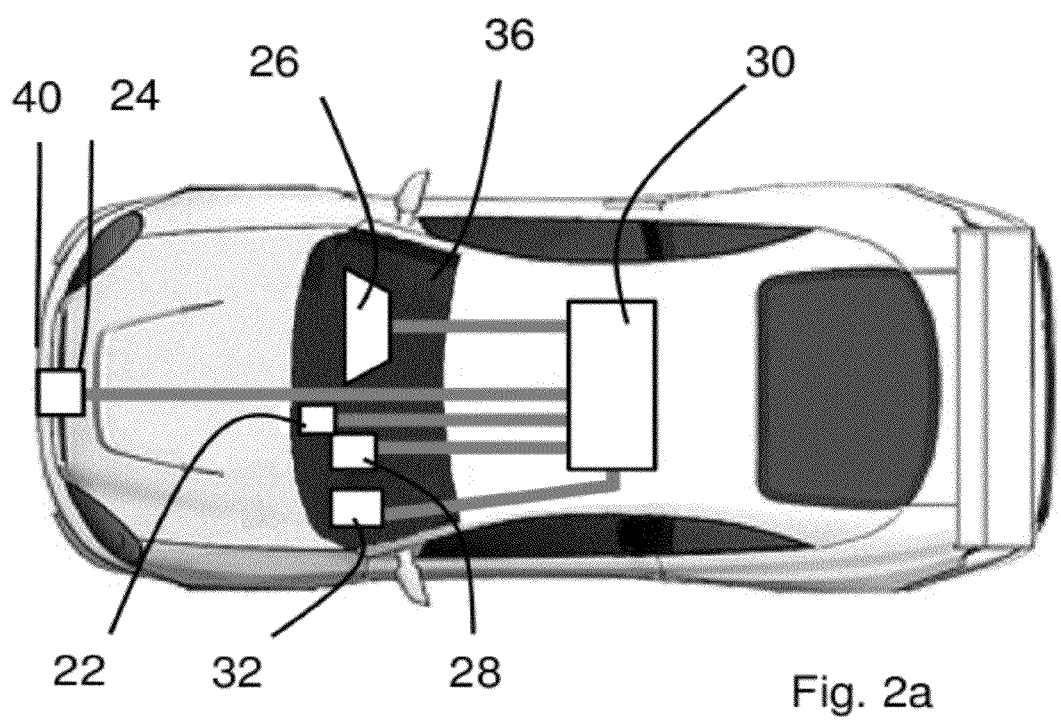
FIG. 2a is a top view of an illustrative diagram for showing the installation of the system in FIG. 1 in a vehicle, according to an embodiment of the present invention.
Figure 2B:
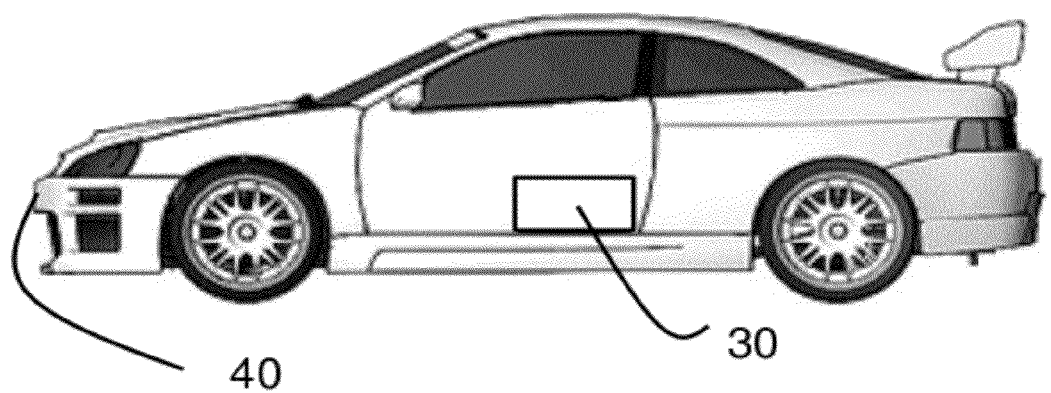

Referring now to FIG. 2, the installation of the subsystems on a conventional vehicle 34 is described. The sudden slowdown detection subsystem 22 is installed just within a front windshield 36 of the vehicle 34. The slight bump detection subsystem 24 is installed at the front end of the vehicle 34, for example mounted right behind a front slight bumper 38 of the vehicle 34. This location ensures that the force of the slight bump can be fully detected by the slight bump detection subsystem 24 while not easily damaging the subsystem 24. The airbag activation and brake malfunction detection subsystem 26 is installed around the dashboard 40 of the vehicle, or anywhere between the dashboard 40 and the processing unit 30. The rollover detection subsystem 28 is installed below the left side of the front windshield 36. The processing unit 30 is installed preferably below driver's seat where the chance of damage due to collision is minimal. The communication unit 32 is installed along the periphery of the vehicle 34, for example close to a side window 42 of the vehicle 34, such that the signal strength for transmission is the strongest.

Figure 3:
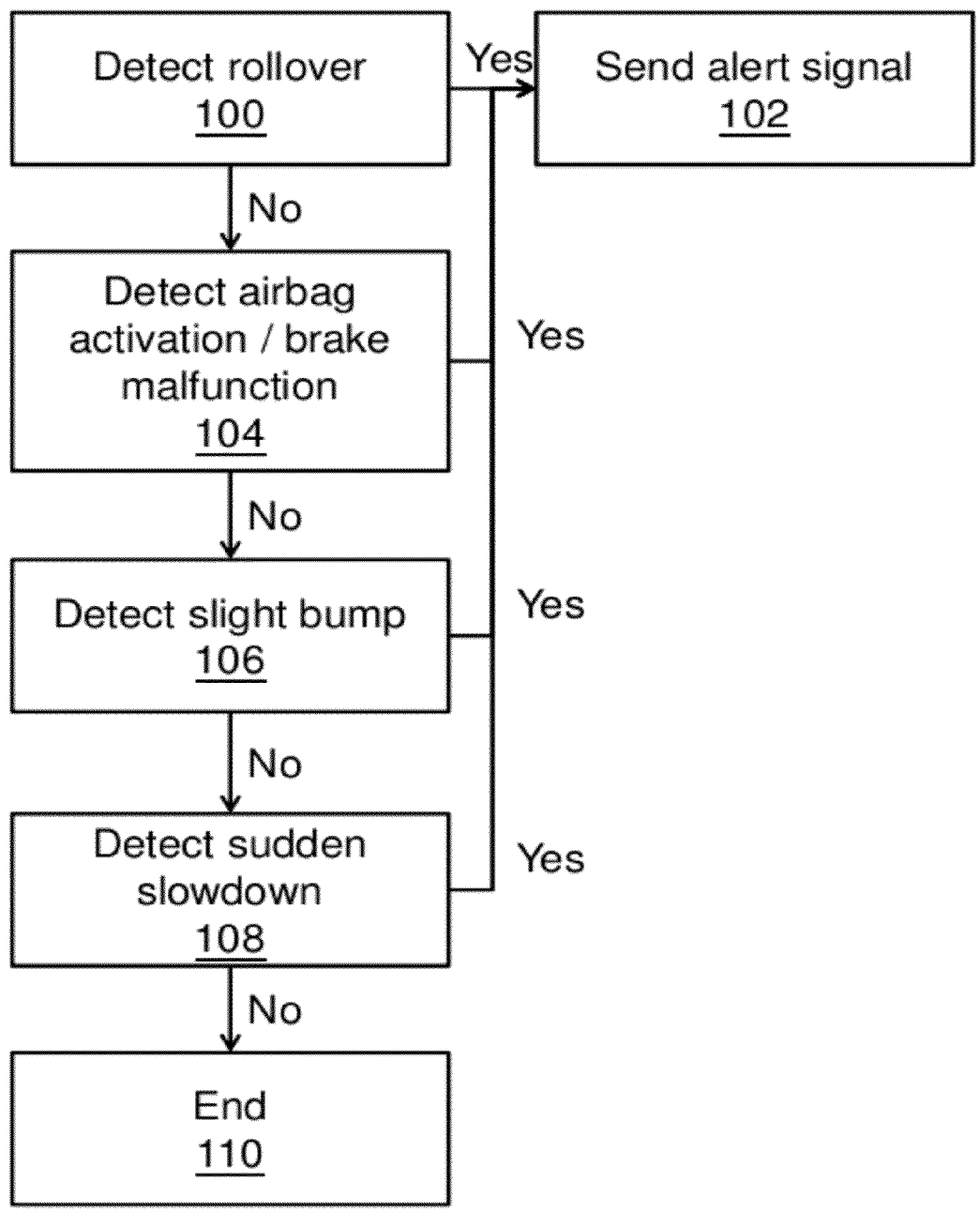
FIG. 3 is a flow chart of an operation of the system in FIG. 1, according to an embodiment of the present invention.

FIG. 3 shows a flow chart of the operation of the system 20. First, the controlling unit 30 determines the severity level of collision, with rollover as the highest severity, then airbag activation and brake malfunction, slight bump, with sudden slowdown having the lowest priority. In step 100, the controlling unit 30 first determines whether the vehicle rolled over based on the data gathered from the three-axis accelerometer. If the data indicates that a rollover has occurred, the controlling unit 30 controls the communication unit 32 to send an alert signal to the traffic center or other parties with all necessary information such as location of the vehicle, acceleration data, data from external sensors etc., as indicated in step 102. If a rollover is not deemed to have occurred, the controlling unit 30 then checks whether the airbag is activated or the brake is malfunctioning in step 104. Similarly, the necessary information is sent by the communication unit 32 if any of this has occurred. The method continues to step 106 and step 108, where occurrence of a slight bump and a sudden slowdown is determined respectively. If none of the four situations occurred, the vehicle is deemed to be normal, and the method ends at step 110.

In an exemplary embodiment, the signals captured from the sensors or accelerometers are filtered of sensor noises before being analyzed by the controlling unit 30.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, the slight bump detection subsystem 24 is also provided at the back or the sides of the vehicle. This can capture the situations where the vehicle may be bumped from behind.

While the airbag activation and brake malfunction subsystem 26 does not need sensors for its function, such sensors such as an additional accelerometer with same settings as the airbag sensor of the vehicle can be deployed as a backup system for the vehicle, such that the reliability of the vehicle can be improved.

The external sensors can also include a tire direction sensor, which can indicate whether a skid has occurred based on the tire direction and also the acceleration data. A video camera can also be installed connecting to the controlling unit 30 for more available data for determining the severity and also cause of any collision or other accidents.

The controlling unit 30 can also detect a sequence of events that has occurred for the collision apart from the severity level. For example, the controlling unit 30 may detect a sudden slowdown or a sudden change of direction before rollover. Such information can also be sent by the communication unit 32 for assisting the analysis of the collision.

What is claimed is:

1. A system for vehicle safety enhancement, comprising:
   a) a sudden slowdown detection subsystem;
   b) a slight bump detection subsystem;
   c) an airbag activation and braking malfunction detection subsystem;
   d) a rollover detection subsystem;
   e) a controlling unit connected to each said subsystem for determining a severity level of a collision involving a vehicle based on data received from each said subsystem; and
   f) a communication unit connected to the controlling unit for transmitting an alert signal based on said severity level of said collision;
   wherein said sudden slowdown detection subsystem comprises a first accelerometer detecting a predetermined direction with a first dynamic range, and said slight bump detection subsystem comprises a second accelerometer detecting said predetermined direction with a second dynamic range;
   wherein said second dynamic range is larger than said first dynamic range;
   wherein said first dynamic range is 6 g and said second dynamic range is between 12 g and 500 g.

2. The system according to claim 1, wherein said first accelerometer is a first single-axis accelerometer, and said second accelerometer is a second single-axis accelerometer.

3. The system according to claim 1, wherein said airbag activation and brake malfunction detection subsystem comprises a detection circuit connected to a dashboard of said vehicle.

4. The system according to claim 1, wherein said rollover detection subsystem comprises a three-axis accelerometer.

5. The system according to claim 1, wherein said sudden slowdown detection subsystem is installed behind a front windshield of said vehicle.

6. The system according to claim 1, wherein said slight bump detection system is installed right behind a front bumper of said vehicle.

7. A method for vehicle safety enhancement comprising the steps of:
   a) determining whether a rollover has occurred for a vehicle;
   b) determining whether an airbag is activated or a brake is malfunctioning for said vehicle, if the result of step a) is false;
   c) determining whether a slight bump has occurred for said vehicle, if the result of steps a) and b) are false;
   d) determining whether a sudden slowdown has occurred for said vehicle, if the result of steps a), b) and c) are false; and
   e) sending an alert signal from a communication unit if the result of any of said above steps is true.

8. The method according to claim 7, wherein said step a) comprises the step of analyzing acceleration data of a three-axis accelerometer in said vehicle.

9. The system according to claim 1, further comprising an acceleration pedal sensor, tire direction sensor and a video camera, which are all connected to said controlling unit to provide additional information for processing.

10. The system according to claim 1, wherein said controlling unit is installed below a driver's seat.

11. The system according to claim 1, further comprising a further slight bump detection system provided at the back of the vehicle.

12. The system according to claim 1, wherein said communication unit is a GPRS unit.

13. The system according to claim 1, wherein said second dynamic range is 12 g, 30 g, 70 g or 500 g.

* * * * *